(12) United States Patent
Jiang et al.

(10) Patent No.: US 12,104,977 B1
(45) Date of Patent: Oct. 1, 2024

(54) COUPLING DEVICE BETWEEN A TEST BOX AND A COMPANION TEST BOX FOR BACK-TO-BACK PLANETARY TESTING

(71) Applicant: NO.703 Research Institute of CSSC, Harbin (CN)

(72) Inventors: Lidong Jiang, Harbin (CN); Lin Fu, Harbin (CN); Shan Chang, Harbin (CN)

(*) Notice: Subject to any disclaimer, the term of this patent is extended or adjusted under 35 U.S.C. 154(b) by 0 days.

(21) Appl. No.: 18/492,688

(22) Filed: Oct. 23, 2023

(30) Foreign Application Priority Data

May 22, 2023 (CN) .......................... 202310576308.X

(51) Int. Cl.
*G01M 13/02* (2019.01)
*G01M 13/021* (2019.01)

(52) U.S. Cl.
CPC ................................. *G01M 13/021* (2013.01)

(58) Field of Classification Search
CPC .. G01M 13/021; G01M 13/02; G01M 13/026; G01M 13/025; G01M 13/028; G01M 13/023; G01M 13/04; G01M 13/00; G01M 7/00; G01M 13/022; G01M 13/027; G01M 17/022; G01M 7/045; G01M 7/08; G01M 15/044
USPC ......................................................... 73/162
See application file for complete search history.

(56) References Cited

U.S. PATENT DOCUMENTS 3,680,373 A * 8/1972 Kearfott .............. G01M 13/021
73/162

FOREIGN PATENT DOCUMENTS

| CN | 201170265 Y | | 12/2008 | |
|---|---|---|---|---|
| CN | 102213643 A | | 10/2011 | |
| CN | 202203290 U | | 4/2012 | |
| CN | 105889344 A | | 8/2016 | |
| CN | 108312896 A | * | 7/2018 | .............. B60L 15/32 |
| CN | 208646616 U | * | 3/2019 | .............. B60L 15/32 |
| CN | 110487539 A | | 11/2019 | |
| CN | 211401676 U | | 9/2020 | |
| CN | 216895680 U | * | 7/2022 | |
| CN | 116292658 B | * | 9/2023 | ............... F16D 3/18 |
| CN | 219798698 U | * | 10/2023 | |
| DE | 2554207 A1 | | 6/1976 | |
| EP | 2270333 A1 | * | 1/2011 | .............. F03D 15/00 |
| RO | 126781 B1 | * | 10/2012 | |
| WO | WO-2015185036 A1 | * | 12/2015 | ........... F16H 1/2863 |

* cited by examiner

*Primary Examiner* — Andre J Allen
(74) *Attorney, Agent, or Firm* — Novoclaims Patent Services LLC; Mei Lin Wong

(57) ABSTRACT

A coupling device between a test box and a companion test box for back-to-back planetary testing to solve the problem of axial displacement and motion in the connecting structure of the existing back-to-back planetary test bench, which comprises a first output flange, a second output flange, a first transition coupling gear connected to the first output flange, a second transition coupling gear connected to the second output flange, a ring-shaped toothed flange with internal teeth coupled to the first and the second transition coupling gears, an axial limiting unit installed on the left and right sides of the toothed flange and extends towards the axis of the transmission shaft formed by two semicircular shaped grooved sleeve bodies, a radial limiting ring and screw rods, and an axial compensation groove formed on an inner sidewall of the axial limiting unit.

3 Claims, 2 Drawing Sheets

COUPLING DEVICE BETWEEN A TEST BOX AND A COMPANION TEST BOX FOR BACK-TO-BACK PLANETARY TESTING

FIELD OF INVENTION

The present invention relates to a coupling device, in particular to a coupling device between a test box and a companion test box for planetary back-to-back testing, which is used to test the connection between a planetary gearbox and a companion planetary gearbox during a back-to-back planetary test.

DESCRIPTION OF RELATED ARTS

Planetary gear transmission has many unique characteristics such as power splitting, input and output coaxiality, and reasonable use of internal meshing. Compared with ordinary fixed-axis gear transmission, it has the advantages of small mass, small volume, large transmission ratio, large load-bearing capacity, smooth transmission and high transmission efficiency. Planetary gear transmission is suitable for high-speed, high-power, and can be used in low-speed, high-torque mechanical transmission devices. Therefore, it has been increasingly widely used in industrial fields such as lifting and transportation, engineering machinery, metallurgy and mining, petrochemical industry, automobiles, ships, weapons, aerospace and other industries.

The test bench for closed power flow test of planetary gearbox usually connects the back-to-back (output end and output end) of the test planetary gearbox and the companion test planetary gearbox through a connecting mechanism. Through the loader, an extra-long transmission shaft system is used between the input end and the test planetary gearbox to connect the interior of the companion test planetary gearbox to form a closed state.

During the construction of the test bench for planetary back-to-back testing, it is necessary to connect the test planetary gearbox and the companion test planetary gearbox. Due to the limited distance between the test planetary gearbox and the companion test planetary gearbox, the problem of limited connecting space is usually encountered during construction. The limited space limits the convenience of installation, making installation difficult and the installation accuracy difficult to ensure.

In the patent publication number CN211401676U, titled 'Heavy-load planetary transmission machinery closed power flow type same-side loading connecting structure', the connecting structure includes two connecting flanges and internal gear sleeves. The two connecting flanges are installed on the output flanges of the test planetary gearbox and the accompanying test planetary gearbox respectively. The two connecting flanges are connected through the internal gear sleeves. Although the above-mentioned connecting structure solves the problem of installation difficulty, due to the large displacement and movement of the internal gear sleeve in the axial direction during high-speed operation, it is impossible to ensure the safe and stable operation of the planetary gear transmission test.

In summary, the connecting structure of the existing planetary back-to-back test bench has axial displacement and movement problems, which makes it impossible to ensure safe and stable operation of the planetary gear transmission test.

SUMMARY OF THE PRESENT INVENTION

An object of the present invention is to solve the problem of axial displacement and motion in the connecting structure of the existing planetary back-to-back test bench, which results in the inability to ensure safe and stable operation of the planetary gear transmission test, and to further provide a connecting device between a test box and a companion test box for back-to-back planetary gearbox testing.

The technical solution of the present invention is: a coupling device between a test box and a companion test box for back-to-back planetary testing, which comprises a first output flange, a second output flange, a first transition coupling gear and a second transition coupling gear. The first output flange has one end connected to a test planetary gearbox, the second output flange has one end connected to a companion planetary gearbox. The first transition coupling gear is connected to the other end of the first output flange. The second transition coupling gear is connected to the other end of the second output flange. The coupling device also comprises a toothed flange and an axial limiting unit. The toothed flange is coupled to a top of the first transition coupling gear and the second transition coupling gear. The axial limiting unit is installed on the left and right sides of the toothed flange and extends towards the axis of the transmission shaft. The axial limiting unit has an inner sidewall and an axial compensation groove from in the inner sidewall. The axial compensation groove is positioned to cover upper outer sides of the first transition coupling gear and the second transition coupling gear.

Furthermore, the toothed flange comprises a first toothed flange and a second toothed flange. The longitudinal cross-sectional shape of the first toothed flange and the second toothed flange is "L" shape. The first toothed flange and the second toothed flange are arranged in mirror position on the left and right side. The vertical sections of the first toothed flange and the second toothed flange are connected through connectors. On inner sidewalls of horizontal sections of the first toothed flange and the second toothed flange, internal teeth are provided to mesh with the first transition coupling gear and the second transition coupling gear.

Furthermore, upper ends of the horizontal sections of the first toothed flange and the second toothed flange are respectively processed with a retaining groove.

Furthermore, the axial limiting unit comprises two position limiting plates, each position limiting plate has an upper part, a middle part and a bottom part. The upper parts of the two position limiting plates are respectively clicked in the retaining grooves of the first toothed flange and the second toothed flange, the middle parts of the two position limiting plates are respectively connected to outer end surfaces of the first toothed flange and the second toothed flange through connectors, and the bottom parts of the two position limiting plates extend downward respectively.

Preferably, the toothed flange is a ring-shaped flange with internal teeth.

Furthermore, the toothed flange is processed to having n number of threaded holes in the circumferential direction, and the number of n is 2, 4, or 6.

Furthermore, the axial limiting unit comprises two semicircular shaped groove sleeve body. The two semicircular shaped grooved sleeve bodies are snapped onto an outer wall of the toothed flange, and an inner wall of the groove-shaped sleeve body is provided with an axial compensation groove.

Preferably, the groove-shaped sleeve body has a through hole opened at a position corresponding to the threaded hole.

Furthermore, the coupling device further comprises a radial limiting ring a plurality of screw rods. The radial limiting ring is coaxially mounted on the transmission shaft. Each screw rod passes through a through hole and a threaded hole and is screwed on the radial limiting ring, thus realizing the radial limiting ring to offset the inner surfaces of the first transition coupling gear and the second transition coupling gear.

Preferably, a longitudinal cross-sectional shape of the radial limiting ring 15 is an inverted T shape.

Compared with the existing technologies, the present invention has the following advantageous effects:

1. The present invention adopts a combination of gear coupling and flange connection to make the connection and installation of the test box and the companion test box precise and convenient. In particular, the present invention adopts gear coupling. During assembly, it is only necessary to pre-install in the sides of the test box and the companion test box, push the side of the companion test box into the toothed flange and then connect. By utilizing the characteristics of coaxial lines, the precise connection and installation between the test box and the companion test box for back-to-back planetary testing is achieved. The entire installation process is simple and convenient.

2. The coupling device of the present invention can not only realize positioning in the axial direction, but also realize axial displacement compensation during assembly and actual work conditions by providing axial compensation grooves in the axial direction. This ensures that the entire test bench can operate safely and smoothly.

3. The present invention is suitable for connecting equipment of different weights (see the working principle of the present invention for details), and has a wide range of applications.

DETAILED DESCRIPTION OF THE PREFERRED EMBODIMENT

Figure 1:
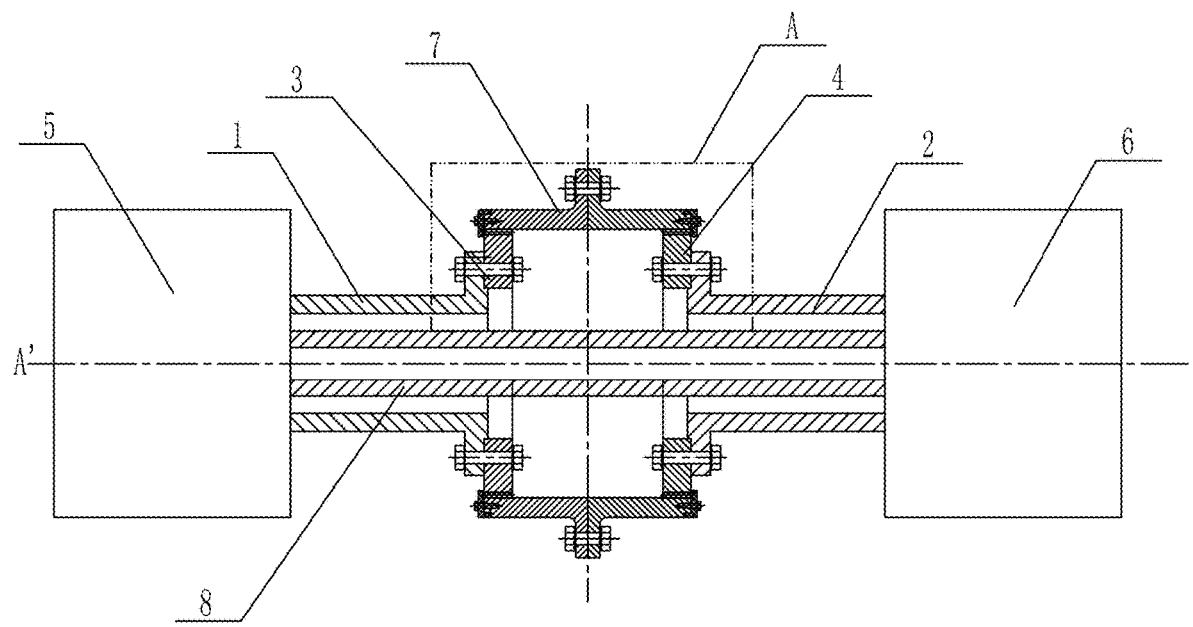
FIG. 1 is a schematic diagram of the overall structure of the present invention when a split-type gear flange is employed.

Preferred Embodiment 1: This embodiment is described below with reference to FIGS. 1-3. According to this embodiment, a coupling device between a test box and a companion test box for back-to-back planetary testing comprises a first output flange 1, a second output flange 2, a first transition coupling gear 3 and a second transition coupling gear 4. The first output flange 1 has one end connected to a test planetary gearbox 5, the second output flange 2 has one end connected to a companion planetary gearbox 6. The first transition coupling gear 3 is connected to the other end of the first output flange 1. The second transition coupling gear 4 is connected to the other end of the second output flange 2. The coupling device also comprises a toothed flange 7 and an axial limiting unit 100. The toothed flange 7 is coupled to a top of the first transition coupling gear 3 and the second transition coupling gear 4. The axial limiting unit 100 is installed on the left and right sides of the toothed flange 7 and extends towards the axis A' of the transmission shaft 8. The axial limiting unit 100 has an inner sidewall 102 and an axial compensation groove 9 from in the inner sidewall 102. The axial compensation groove 9 is positioned to cover upper outer sides 32, 42 of the first transition coupling gear 3 and the second transition coupling gear 4.

The axial compensation groove 9 in this embodiment is used to realize the displacement compensation of the toothed flange 7 in the axial direction.

Preferred Embodiment 2: This embodiment is described below with reference to FIGS. 1 and 2. According to this embodiment, the toothed flange 7 comprises a first toothed flange 7-1 and a second toothed flange 7-2. The longitudinal cross-sectional shape of the first toothed flange 7-1 and the second toothed flange 7-2 is "L" shape. The first toothed flange 7-1 and the second toothed flange 7-2 are arranged in mirror position on the left and right side. The vertical sections 711, 721 of the first toothed flange 7-1 and the second toothed flange 7-2 are connected through connectors 75. On inner sidewalls 7121, 7221 of horizontal sections 712, 722 of the first toothed flange 7-1 and the second toothed flange 7-2, internal teeth 73 are provided to mesh with the first transition coupling gear 3 and the second transition coupling gear 4 respectively.

With this arrangement, when installing the split-type gear flange employed in this embodiment, the toothed flange 7 and the transitional coupling gear 3 (4) can be installed separately for the test box and the companion test box. When the first toothed flange 7-1 and the second toothed flange 7-2 are biased against each other, the first toothed flange 7-1 and the second toothed flange 7-2 are simply connected by bolts. The entire connecting process is simple and reliable, what can avoid the traditional connecting method which involves the small space between the test box and the companion test box, thus solving the problem of installation difficulties caused by connecting the test box and the companion test box. Other components and connection relationships are the same as in the Preferred Embodiment 1.

The split gear flange in this embodiment has a simple structure and is convenient for mass production. During installation, only the first toothed flange 7-1 and the second toothed flange 7-2 in the circumferential direction are needed to be connected. And since the first toothed flange 7-1 and the second toothed flange 7-2 can be rotated, they only need to operate in the space between the test planetary gearbox 5 and the companion planetary gearbox 6, which is easy for the operating staff to install.

Preferred Embodiment 3: This embodiment is described below with reference to FIGS. 1 and 2. According to this embodiment, upper ends of the horizontal sections of the first toothed flange 7-1 and the second toothed flange 7-2 are respectively processed with a retaining groove 11.

Other components and connection relationships are the same as those in the Preferred Embodiment 1 or 2.

Preferred Embodiment 4: This embodiment is described below with reference to FIGS. 1 and 2. According to this embodiment, the axial limiting unit 100' comprises two position limiting plates 10, each of the two position limiting plates 10 has an upper part 101, a middle part 103 and a bottom part 105. The upper parts 101 of the two position limiting plates 10 are respectively clicked in the retaining grooves 11 of the first toothed flange 7-1 and the second toothed flange 7-2, the middle parts of the two position limiting plates 10 are respectively connected to outer end surfaces of the first toothed flange 7-1 and the second toothed flange 7-2 through connectors 74, and the bottom parts 105 of the two position limiting plates 10 extend downward respectively. The retaining groove 11 is mainly used to secure the position limiting plates 10 into position in the radial direction.

With this arrangement, the position limiting plate 10 not only serves to limit the position of the gear flange in the axial direction, but also the axial compensation groove 9 at the bottom part 105 realizes the compensation function of the first transition coupling gear 3 and the second transition coupling gear 4 when micro-displacement occurs, and assembly errors need to be adjusted. Other components and connection relationships are the same as those in the Preferred Embodiment 1, 2 or 3.

In this embodiment, the first output flange 1 and the first transition coupling gear 3 are connected by bolts to achieve positioning in the axial and radial directions.

Preferred Embodiment 5: This embodiment is described below with reference to FIGS. 1 and 3. According to this embodiment, the toothed flange 7 is a ring-shaped flange with internal teeth 73. With this arrangement, the toothed flange 7 is a one-piece toothed flange, which is easy to manufacture. During installation, the only step is pushing the transition coupling gear into position. Other components and connection relationships are the same as any one of those in the Preferred Embodiments 1-4.

Preferred Embodiment 6: This embodiment is described below with reference to FIGS. 1 and 3. According to this embodiment, the toothed flange 7 is processed to having n number of threaded holes 12 in the circumferential direction, and the number of n is 2, 4, or 6. With this arrangement, the connection with a radial limiting ring 15 is facilitated. Other components and connection relationships are the same as any one of those in the Preferred Embodiments 1-5.

Preferred Embodiment 7: This embodiment is described below with reference to FIG. 3. According to this embodiment, the axial limiting unit comprises two semicircular shaped grooved sleeve body 13. The two semicircular shaped grooved sleeve bodies 13 are snapped onto an outer wall of the toothed flange 7, and an inner wall of the groove-shaped sleeve body 13 is provided with an axial compensation groove 9. With this arrangement, the only step is snapping into position, making installation simple and convenient. Other components and connection relationships are the same as any one of those in the Preferred Embodiments 1-6.

Preferred Embodiment 8: This embodiment is described below with reference to FIG. 3. According to this embodiment, the groove-shaped sleeve body 13 has a through hole 14 opened at a position corresponding to the threaded hole 12. With this arrangement, the connection with a radial limiting ring 15 is facilitated. Other components and connection relationships are the same as any one of those in the Preferred Embodiments 1-7.

Preferred Embodiment 9: This embodiment is described below with reference to FIG. 3. According to this embodiment, the coupling device further comprises a radial limiting ring 15 a plurality of screw rods 16. The radial limiting ring 15 is coaxially mounted on the transmission shaft 8. Each screw rod 16 passes through a through hole 14 and a threaded hole 12 and is screwed on the radial limiting ring 15, thus realizing the radial limiting ring 15 offset the inner surfaces of the first transition coupling gear 3 and the second transition coupling gear 4. With this arrangement, by limiting the toothed flange 7 in the radial direction, the toothed flange 7 is prevented from axial and radial displacement. Other components and connection relationships are the same as any one of those in the Preferred Embodiments 1-8.

Preferred Embodiment 10: This embodiment is described below with reference to FIG. 3. According to this embodiment, a longitudinal cross-sectional shape of the radial limiting ring 15 is a "凸" shape (that is, an inverted T-shape structure). With this arrangement, the radial limiting ring 15 facilitates a more secured connection with the screw rod 16. Other components and connection relationships are the same as any one of those in the Preferred Embodiments 1-9.

The working principle of the present invention is further explained with reference to FIGS. 1 to 3.

Preparation for connection and installation: Position the output flanges of the test planetary gearbox and the companion test planetary gearbox with respect to the transition coupling gears through the stop openings, and fix them with nuts, washers, and connecting bolts to secure into position.

Figure 2:
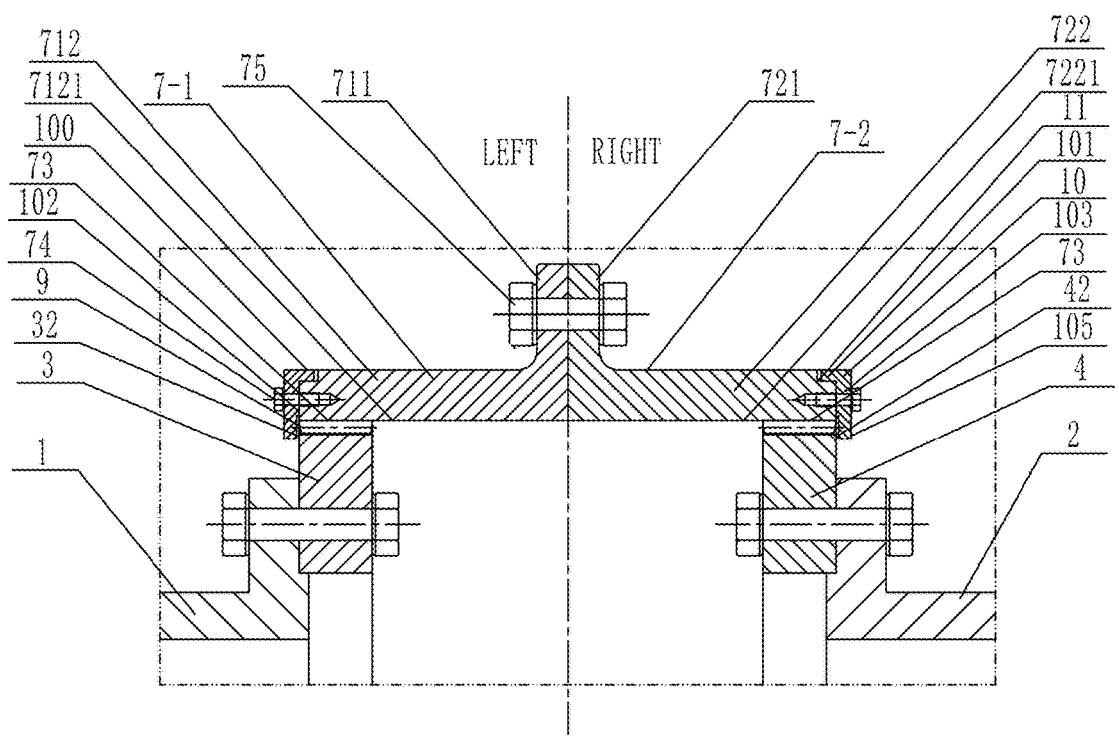
FIG. 2 is a partially enlarged view of 'A' in FIG. 1.

With reference to FIG. 1, the connection and installation method 1 is as follows: When the weight of the test planetary gearbox 5 and the companion test planetary gearbox 6 is relatively light, the two toothed flanges 7 are connected through connecting bolts, washers, and nuts to form a gear flange assembly, which is meshed with the first transition coupling gear 3 on the test planetary gearbox 5 and installed in place; the companion test planetary gearbox 6 is pushed forward slowly until the second transition coupling gear 4 on the companion test planetary gearbox 6 meshes with the gear flange assembly and are installed in place; the two position limiting plates 10 are installed to the two toothed flanges respectively through screws and locking plates to prevent the gear flange assembly from axial transmission movement and motion; at this point, the installation is completed.

With reference to FIG. 1, the connection and installation method 2 is as follows: When the weight of the test planetary gearbox 5 and the companion test planetary gearbox 6 is relatively heavy, the toothed flange 7 are hung on the test planetary gearbox 5 and the companion test planetary gearbox 6 through the transition coupling gears; place the test planetary gearbox 5 and the accompanying test planetary gearbox 6 into position according to the installation equipment relationship; the toothed flange 7 is moved axially slowly and meshed with the transition coupling gears installed on the test planetary gearbox 5 and the companion test planetary gearbox 6 to install into position; according to the meshing relationship and the transmission system of the planetary gearbox, the two toothed flanges 7 are connected into one component through connecting bolts, washers, and nuts; the two position limiting plates 10 are installed to the two toothed flanges respectively through screws and locking plates to prevent the gear flange assembly from axial transmission movement and motion; at this point, the installation is completed.

Figure 3:
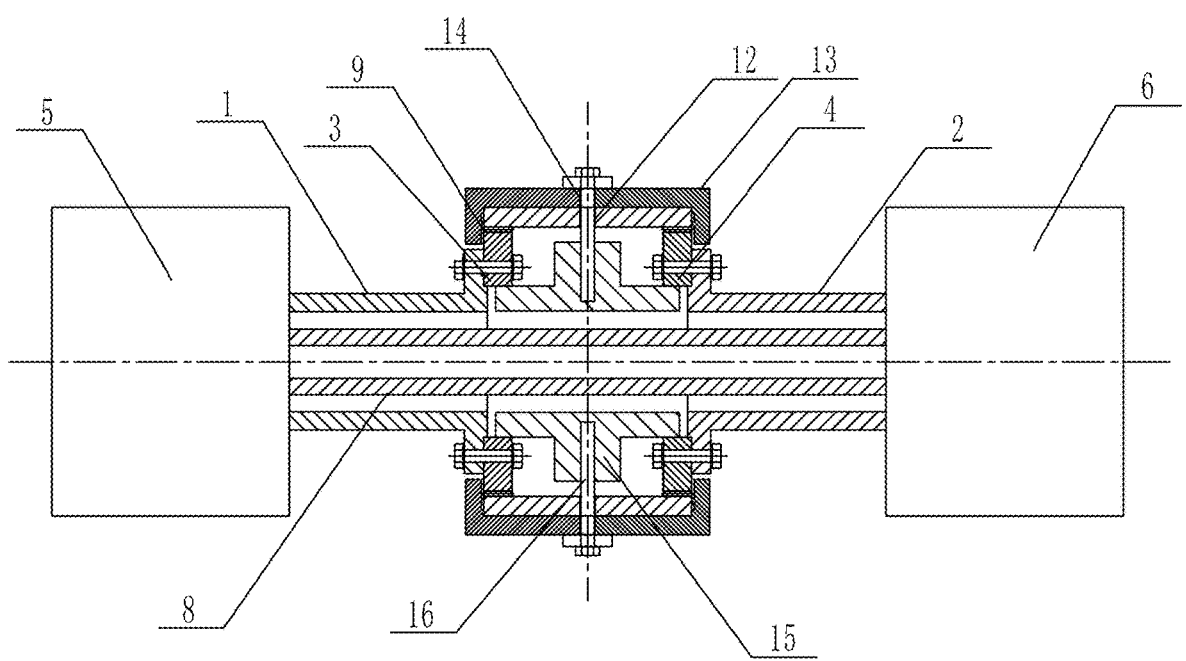
FIG. 3 is a schematic diagram of the overall structure of the present invention when an integral gear flange is employed.

With reference to FIG. 3, the connection and installation method 3 is as follows: First, the installation of the structure on the test planetary gearbox 5 side is performed. The first output flange 1 and the first transition coupling gear 3 are connected by bolts, and the radial limiting ring 15 is arranged on the transmission shaft 8. The left side of the radial limiting ring 15 is set on the first transition coupling gear 3, and then the integral toothed flange 7 is set on the first transition coupling gear 3. The installation of the structure on companion test planetary gearbox 6 side is performed in the same manner as described above. Then, the second transition coupling gear 4 on the test planetary gearbox 6 side is pushed into the toothed flange 7. Then the grooved sleeve body 13 is snapped into the toothed flange 7. Finally the screw rod 16 passes through the through hole 14 and the threaded hole 12 and is screwed to the radial limiting ring 15, thereby realizing the radial limiting ring 15 to offset the inner surfaces of the first transition coupling gear 3 and the second transition coupling gear 4. The installation is now complete.

Although the present invention has been disclosed above in terms of preferred embodiments, this is not intended to limit the present invention. Those skilled in the art can also make other changes within the spirit of the present invention and apply it to fields not mentioned in the present invention. Of course, these changes made based on the spirit of the present invention should be included in the scope of protection claimed by the present invention.

What is claimed is:

1. A coupling device between a test box and a companion test box for back-to-back planetary testing, which comprises a first output flange, a second output flange, a first transition coupling gear and a second transition coupling gear, wherein said first output flange has one end connected to a test planetary gearbox, said second output flange has one end connected to a companion planetary gearbox, said first transition coupling gear is connected to another end of said first output flange, said second transition coupling gear is connected to another end of said second output flange, characterized in that:

said coupling device further comprises a toothed flange and an axial limiting unit, wherein said toothed flange is coupled to top portions of said first transition coupling gear and said second transition coupling gear, said axial limiting unit is arranged on left and right sides of said toothed flange and extends towards an axis of a transmission shaft, said axial limiting unit has an inner sidewall and an axial compensation groove formed in said inner sidewall, said axial compensation groove is positioned to cover top outer sides of said first transition coupling gear and said second transition coupling gear, wherein said toothed flange is a ring-shaped flange with internal teeth, said axial limiting unit comprises two semicircular shaped grooved sleeve bodies, a radial limiting ring and a plurality of screw rods, wherein said two semicircular shaped grooved sleeve bodies are snapped onto an outer wall of said toothed flange, said groove-shaped sleeve body has a through hole opened at a position corresponding to said threaded hole, wherein said radial limiting ring is coaxially mounted on said transmission shaft, each said screw rod passes through one said through hole and one said threaded hole and is screwed on said radial limiting ring, thus realizing said radial limiting ring to offset inner surfaces of said first transition coupling gear and the second transition coupling gear.

2. The coupling device between a test box and a companion test box for back-to-back planetary testing according to claim 1, characterized in that, said toothed flange has n number of threaded holes in a circumferential direction.

3. The coupling device between a test box and a companion test box for back-to-back planetary testing according to claim 2, characterized in that, a longitudinal cross-sectional shape of said radial limiting ring is an inverted T shape.

* * * * *